United States Patent
Hojo et al.

[15] 3,684,384
[45] Aug. 15, 1972

[54] POSITIONING ARRANGEMENT AND FACE DOWN BONDER INCORPORATING THE SAME

[72] Inventors: Toku Hojo, Yokohama; Takao Matui, Setagaya; Rikiti Kimura, Ota, all of Japan

[73] Assignee: Hitachi, Ltd., Tokyo, Japan

[22] Filed: March 17, 1970

[21] Appl. No.: 20,337

[30] Foreign Application Priority Data

March 17, 1969 Japan....................44/19566
March 17, 1969 Japan....................44/19567

[52] U.S. Cl. ..................356/172, 350/30, 350/81, 350/174, 356/154, 356/166, 356/168
[51] Int. Cl..............................................G01b 11/27
[58] Field of Search ..350/30, 81, 174; 356/172, 153, 356/154, 166, 168, 156, 71

[56] References Cited

UNITED STATES PATENTS 3,388,848   6/1968   Youmans et al..............350/81
3,297,391   1/1967   Benford et al................350/91

FOREIGN PATENTS OR APPLICATIONS 943,242   1963   Great Britain...............350/30

*Primary Examiner*—Ronald L. Wibert
*Assistant Examiner*—Jeff Rothenberg
*Attorney*—Craig, Antonelli & Hill

[57] ABSTRACT

Two components to be mated together in registration are opposed to each other so as to be adjustable in their mutual position horizontally and vertically, and there is inserted between the two components a compound prism formed with a truncated quadrangular, right prism with a 45° truncation and a rectangular prism united to the prism to form a parallelopiped with a half-silvered mirror film at their interface and with a total reflecting mirror film at the vertical surface of the rectangular prism, so that the two components are opposed in their mated positions and provide for indication of registration from superposition of the two images of the components by adjusting the mutual position therebetween.

5 Claims, 6 Drawing Figures

PATENTED AUG 15 1972 3,684,384

POSITIONING ARRANGEMENT AND FACE DOWN BONDER INCORPORATING THE SAME

BACKGROUND OF THE INVENTION

1. Field of the Invention

This invention relates to an arrangement for matching the relative positions of two components to be bonded or matched face to face together, and more specifically to a positioning arrangement that facilitates the matching and bonding of minute semiconductor chips to their substrates in the art of fabricating semiconductor devices, and also to a face-down bonding apparatus (which is hereinafter called an FD bonder for simplicity) equipped with such a positioning arrangement.

Integrated circuit chips (hereinafter called IC chips), developed with the view to manufacturing electronic apparatus and appliances smaller in size and higher in density, functioning speed and reliability than before, are in general too tiny for ready incorporation into such apparatus. It is common practice, therefore, to mount, seal and protect each chip in a case known as a package, which is provided with lead terminals for external connections for the convenience in packaging the chip in a particular apparatus or appliance (such encased chip being hereinafter called a packaged IC).

Another practice gaining growing acceptance in the art is to bond a number of IC chips onto a single ceramic circuit substrate (hereinafter called a substrate) or the like on which thin- or thick-film circuits are formed beforehand, thus attaining a large scale integration (hereinafter called an LSI).

In the fabrication of such a packaged IC or LSI, each package or substrate and each IC chip are bonded together by a "flip-chip face-down bonding method" (hereinafter called FD bonding method). The method is to provide each IC chip with lead-out terminals (hereinafter called pads) for the internal circuit elements and also provide each package or substrate with terminals (hereinafter called pedestals) for connection with the pads, place the IC chip face down on the substrate, position the two surfaces so that the pads are exactly and intimately mated with the pedestals, and then accomplish bonding of the two components by heating with pressure or by ultrasonic oscillation.

According to the FD bonding method, all of the pads can be simultaneously bonded to the pedestals in a single operation. Other advantages of the method over the face-up wire bonding method whereby the individual pads and pedestals are connected, one by one, with fine metallic wires, includes a remarkable reduction in the number of production steps or manhours required, about 50 percent cut in the number of connections, improved reliability, and increased functioning speed owing to the omission of metallic wires.

However, the method has had a drawback in that the procedure of placing IC chips face down on their substrates involves difficulty in positioning the two so that the pads and pedestals are exactly mated together.

DESCRIPTION OF THE PRIOR ART

Positioning the pads and pedestals in an exactly matched relationship is, indeed, not easy because the former must be mated face down with the latter.

There have been arrangements using half-silvered mirrors for exact positioning of two components so that their surfaces are opposed or matched to each other. Typical of the prior art arrangements is that in which a half-silvered mirror is interposed parallelly between two components opposed to each other, wherein one sees from above one component the image thereof as reflected by the half-silvered mirror and adjusts the relative positions of the two components until the reflected image coincides with the real image of the other component which is seen through the mirror.

Those positioning arrangements have disadvantages, however. For one thing, the two components to be matched are not adequately illuminated because the arrangement permits only oblique illumination. Secondly, the arrangement includes viewing means above one component and hence the means for holding and moving the said component can provide an obstacle to either or both of the light paths for the said viewing means. Last but not least, an error in focusing may lead to a horizontal positional deviation as large as about 52 microns, which is fatal and therefore intolerable in LSI and IC devices.

SUMMARY OF THE INVENTION

It is an object of the present invention to provide an arrangement for positioning mating objects with a minimum of deviation.

Another object of the invention is to provide a positioning arrangement which is convenient for matching tiny articles or components as in the fabrication of semiconductor devices.

A further object of the invention is to provide an FD bonder convenient for use in the fabrication of packaged IC, LSI and the like arrangements in an economical and highly reliable way.

For the realization of the foregoing objects, the present invention is characterized by the use of a specially designed compound prism.

The compound prism, to be described in detail later, is made by cutting off the upper part of a prismatic block of transparent material at an angle of 45° to obtain a rectangular prism having a horizontal plane which represents the top of the original block and also having sides one of which being a vertical plane, half-silvering the cut surface, reuniting the prism with the rest, and forming a totally reflective mirror film over the vertical plane of the rectangular prism.

Two articles or components to be matched or bonded together are held in such a manner that they can be moved toward or away from each other or parallelly with respect to each other, with their surfaces to be mated being kept apart and facing opposite to each other. Between the two components to be matched is interposed the compound prism with the top and base parallel to the opposing or matching surfaces of the two components. Half-silvered mirrors for illumination purpose are disposed between the compound prism and the two components, so that illuminating light falling on these mirrors is reflected for vertical illumination of the two subjects. Image-forming means is located opposite to the totally reflective mirror film via the half-silvered film of the compound prism.

BRIEF DESCRIPTION OF DRAWINGS

The construction, operating principle, and advantages of the apparatus according to the present invention will be described hereunder in conjunction with the accompanying drawings, in which.

DESCRIPTION OF PREFERRED EMBODIMENT

Figure 1A:
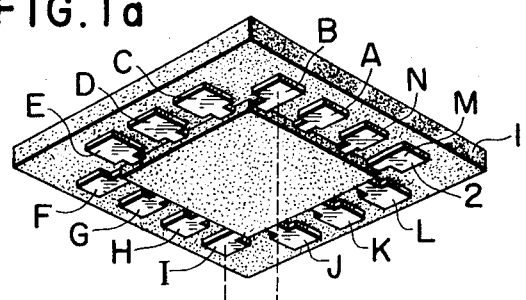
FIGS. 1a and 1b are perspective views illustrative of the relative positions of an IC chip and a substrate, respectively, as an exemplary combination of articles or components to be bonded together, face to face.

In FIG. 1a, which is a perspective view enlarged diagrammatically for the sake of better understanding of an exemplary pad pattern on an IC chip, there is shown a monolithic IC chip 1 formed, on the surface, with pads 2 of thin aluminum film each about 0.4 micron in thickness and about 100 microns square. In this example a total of 14 pads A, B, C ... N are arranged in a square to form a pad pattern as shown.

Figure 1B:
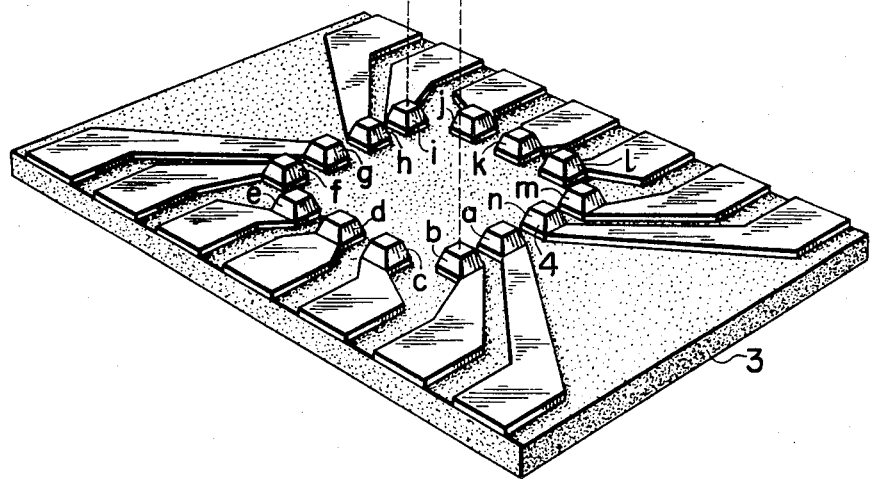
Figure 2:
FIG. 2 is a cross sectional view showing how the IC chip and the substrate are brought into contact with each other.

FIG. 1b is a perspective view on an enlarged scale of a square arrangement of pedestals on a substrate for LSI circuitry that are to be bonded to the pads 2 of FIG 1a. On a ceramic substrate 3 the pedestals are formed by first depositing aluminum thereon by vacuum evaporation and then etching the aluminum layer by a photoetching technique to a desired pattern. A total of 14 pedestals designated by symbols a, b, c ... n are arranged in a corresponding pattern (or in an inverted image relation) to the pads 2 marked A, B, C ... N in FIG. 1a. Each pedestal 4 in the example shown takes the form of a truncated pyramid with a top plane area of about 80 microns square and a height of about 15 microns. The IC chip of FIG. 1a and the substrate of FIG. 1b must be bonded face-down, as illustrated in FIG. 2.

Figure 3:
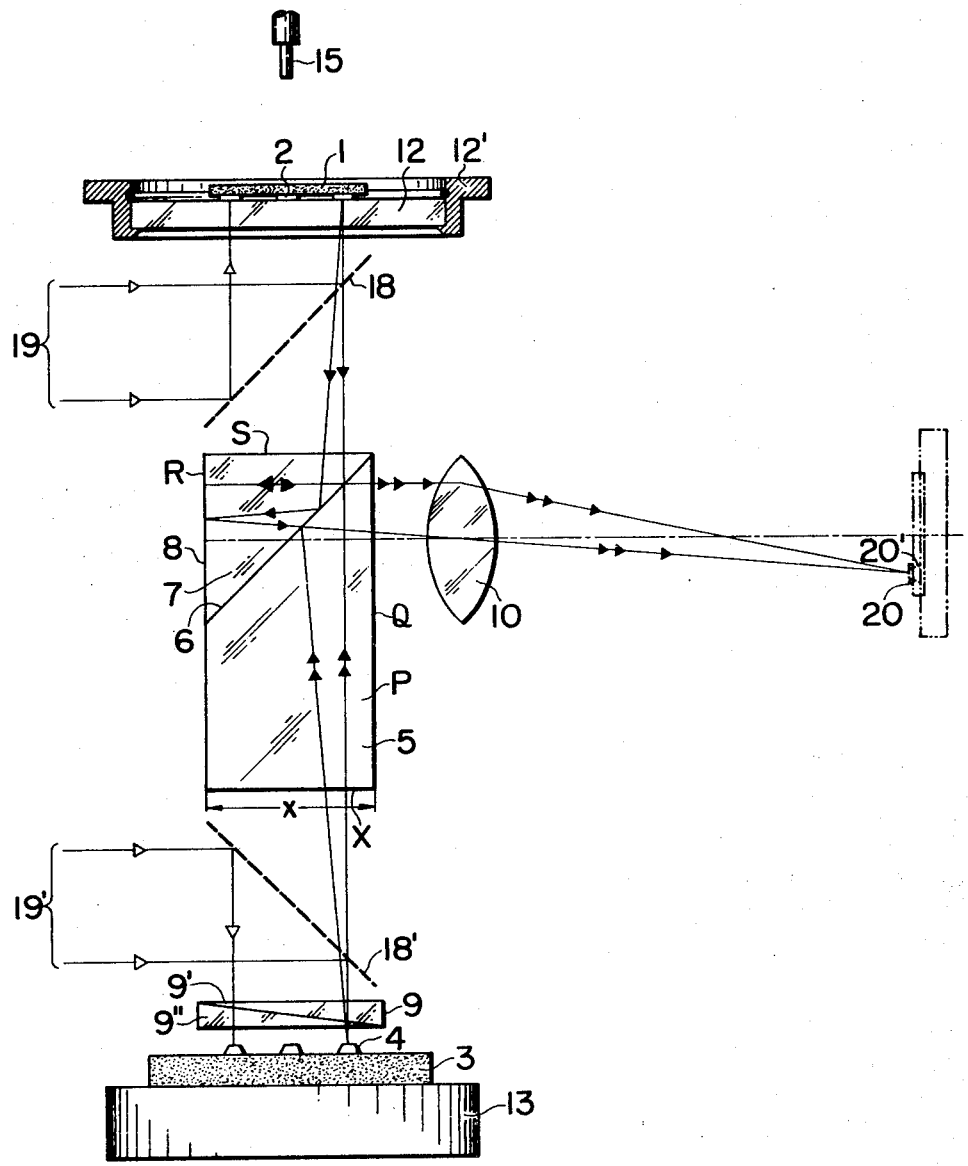
FIG. 3 is a diagrammatic view of a positioning arrangement embodying the present invention.

Next, the construction of the positioning arrangement according to this invention as shown in FIG. 3 will be considered. A compound prism for use in this arrangement will be first explained. The compound prism P is a prismatic block of transparent material, such as glass, having a square base X each side of which measuring $x$, a top S, and a height equivalent to $2x$. The upper portion of the block is cut off at an angle of 45° from a top side downward to obtain a rectangular component prism 7, wherein the top S and a plane R, which is transverse to the plane of the drawing and represents one half of a side plane of the original block, constitute two planes located at a right angle with respect to each other, and a rectangular component prism 5 of a square cross-section with a 45° truncation. Following half-silvering of the interface, the two component prisms are reunited to a block form. Of the two planes of the rectangular prism 7 referred to above, the one that constitutes the vertical plane R of the rectangular prism is provided with a totally reflective mirror film. The compound prism is thus completed.

In this compound prism P the half-silvered or semi-transmissive mirror film serves as a half-silvered mirror 6, and the totally reflective mirror film as a total reflector 8.

With the construction above described, the compound prism P has the top S and the base X in a mirror-to-image relationship. In other words, the prism is so formed that the opposite positions of the top S and the base X coincide exactly on the half-silvered mirror and that the length of the path through which a beam of light from a point on the top is reflected by the half-silvered mirror and the total reflector and falls back on a given point of the half-silvered mirror is equivalent to the length of the path through which a light beam from a point on the base opposite to the said point of the top reaches the point of the half-silvered mirror.

Above the top S and beneath the base X of the compound prism P, there are held two articles or components to be opposed or bonded to each other, so that their surfaces to be matched or bonded together are set parallel to each other and also parallel to the top and bottom of the compound prism P. At least one of the articles or components to be mated is movable toward or away from the compound prism P in the direction parallel to the center axis of the prism, and also movable within a plane perpendicular to the center axis, by fine adjustment means 13.

Next, as shown in FIG. 3, half-silvered mirrors for illumination use are interposed between the compound prism P and the two articles or components to be matched, respectively, in such a manner that a half-silvered mirror 18 is disposed at an angle of 45° with respect to the top S of the compound prism and the opposing or mating surface of the article or component held thereabove, while another half-silvered mirror 18' is inserted again at an angle of 45° to the base X of the prism and the opposing or mating surface of the article or component held therebelow. Parallel fluxes of light 19, 19' from light sources not shown, incident onto the illuminating half-silvered mirrors 18, 18', respectively, are reflected to provide vertical illumination on the pads 2 and the pedestals 4.

In front of the total reflector 8 of the compound prism P and past the half-silvered mirror 6 there is located a lens 10 as opposed accurately to the reflector. Behind the lens there is provided an image-observing means.

The construction of the positioning arrangement according to this invention will be more fully described below, using an IC chip 1 of FIG. 1a and a substrate 3 of FIG. 1b as an exemplary combination of components to be matched. An annular holder 12' located above the top S of the compound prism P holds a transparent glass plate 12, on which an IC chip 1 formed with pads 2 thereon is placed face down, as opposed to the top of the compound prism P through the glass plate 12.

On the other hand, the fine adjustment means 13 which combines a holder base is secured in position beneath the base X of the compound prism P, and a substrate 3 with pedestals 4 facing upward is placed on the holder base.

The positioning arrangement of the present invention thus constructed is operated in the following way. To illustrate the illumination of the arrangement, parallel light fluxes 19, 19' from sources not shown, incident at 45° onto the illuminating half mirrors 18, 18' are reflected, as indicated by blank arrows, to illuminate the pads 2 and pedestals 4 with vertical illumination.

Accordingly, the illumination thus attained is by far the more efficient than the oblique illumination in conventional arrangements. The principal problem of dark images that are usually observed has now been completely solved, and one can see images through the present arrangement even in bright environments. A further advantage of the vertical illumination lies in the possibility of clearly observing IC pattern structures. It is of course possible, though, to utilize oblique illumination by arranging optical fibers around the articles or components to be observed.

Description will now be made, with reference to FIG. 3, of the manner in which the articles or components to be matched are so positioned in accordance with the present invention.

The image of pads 2 illuminated in the foregoing manner, or the light reflected from the pads 2, incident at 45° onto the half-silvered mirror 6, is divided into two substantially equal parts, and, as indicated by solid arrows, one part is reflected to the total reflector 8 and thence is totally reflected back to reenter the half-silvered mirror 6, so that one half of the reentered light is transmitted through the mirror 6 to the lens 10.

On the other hand, the image of the pedestals 4, or the light reflected from the pedestals, incident at 45° onto the half-silvered mirror 6, is divided into two substantially equal parts and, as indicated by solid duplex arrows, one part is reflected rightward as viewed in FIG. 3 to the lens 10.

In view of the foregoing, the relative positions of the lens 10 and image-observing means, which may include a screen (not shown), are first adjusted so that the real image 20 of the pads 2 is formed on the image observing means.

Next, the substrate 3 held on the fine adjustment 13 is moved through fine adjusting means in the horizontal and vertical directions with respect to the compound prism P, in such a way that the image of the pedestals 4, or the light reflected from the pedestals, is allowed by the lens 10 to form a real image 20' as superposed on the real image 20 of the pads 2.

It is noted here that the lens 10, which has a certain depth of focus, provides a distance in which any vertical out of focus of the substrate 3 from the true focus point cannot be distinguished as such, and it leads to a horizontal deviation. Experiments show, however, that the maximum amount of such horizontal deviation is approximately 8.7 microns, or well within the permissible range of deviation for LSI and IC devices. This means that the third disadvantage of the ordinary arrangements has thus been eliminated.

If necessary, a suction tip 15 may be provided above the IC chip 1 so that the chip 1 can be vertically sucked up as with vacuum and then brought down vertically, following the removal of the compound prism P and the associated parts, into opposition or contact with the substrate 3.

In accordance with the present invention, as will be obvious from the drawings, there is no obstacle in the least in the paths of the illuminating light for the IC chip 1 and the substrate nor in the paths for reflected light. This eliminates the second disadvantage of the conventional arrangements as mentioned above.

Desirably a compensating prism 9 that compensates for any residual deviation which may result from some error at the time of fabrication of the compound prism P is interposed between the compound prism and the substrate 3 therebelow. This compensating prism 9 consists, for example, of two wedge-shaped glass plates 9', 9'' placed one upon another in the form of a slab, in which the glass plates are turnable with respect to one another about the axis of the compound prism.

The compensating prism may be made of a material that transmits yellowish green light, so that the image 20' of the pedestals 4 on the substrate 3 may be observed in yellowish green for the convenience in matching the image with the white image 20 of the pads 2 on the IC chip.

To make the matching of images easier, it is effective as well to provide a glass plate 12 marked with a hairline cross or the like at the point of the image observing means where the real image is focused.

Although the compound prism P in the foregoing embodiment of the invention has been described as a square block which is square at both the top and the base and has a height twice the length of each side of the top or the base, the prism may be rectangular at both the top and the base. Also, its height need not be twice as much as the length of each top or base side. What is important is that the top and the base constitute planes parallel to each other and the total reflector and the opposing side Q of the prism 5 likewise be in a parallel relationship. This renders the refractive condition of the light incident on the compound prism P equal to that of the light thereby discharged, and hence precludes any error.

Figure 4A:
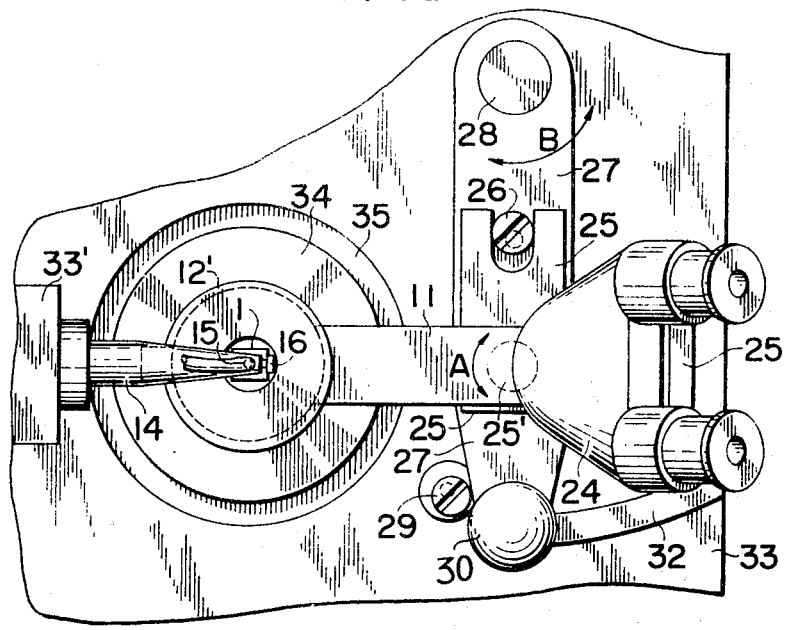
FIGS. 4a and 4b are, respectively, a top view and a side elevational view, partly in section, of an FD bonder incorporating a positioning arrangement embodying the present invention.

Next, an ultrasonic FD bonder incorporating the positioning arrangement of the present invention will be described with reference to FIGS. 4a and 4b, in which like numerals designate like parts in the preceding figures.

In the FD bonder shown, the bed plate 33 is formed with a horizontally finished surface 35, on which is placed a movable base 34 adapted to be horizontally moved by a fine horizontal adjusting mechanism not shown. On the movable base rests a vertical height adjusting plate 38 which is equipped with a vertical fine-pitch screw 36. A substrate support 37 rides on the height adjusting plate 38.

The support 37 is provided with means for securely holding a substrate 3, as for example a vacuum suction means (not shown). The substrate 3, with pedestals 4 facing upward, is held on the support 37 and is shifted to position in exact opposition to a compound prism P with the aid of the fine horizontal adjusting mechanism and vertical fine-pitch screw. In other words, the fine adjusting means 13 of FIG. 3 is composed of the fine horizontal adjusting mechanism, vertical fine-pitch screw 36, support 37, and movable plate 38.

Figure 4B:
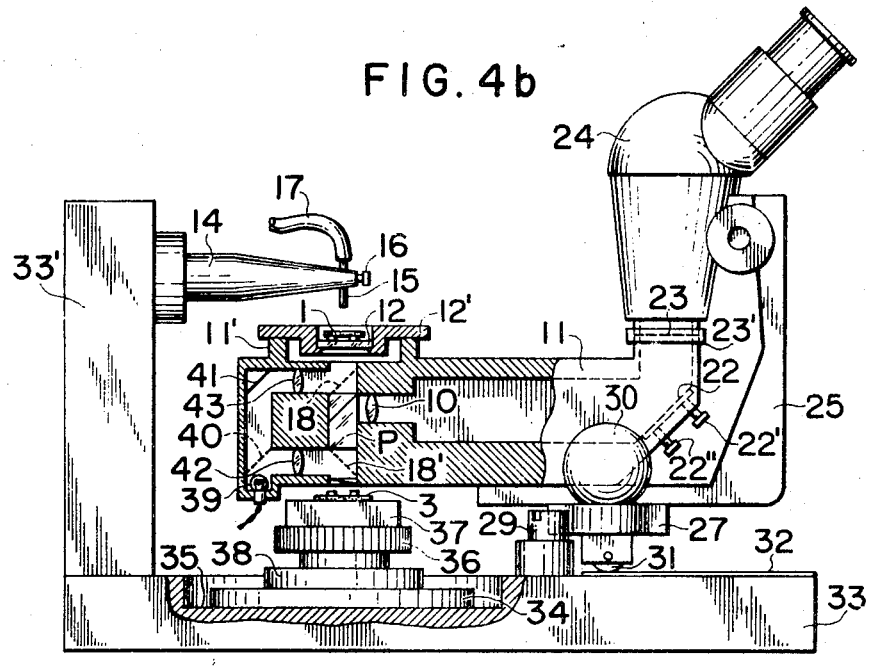

A tubular body 11 houses the optical system as shown in FIG. 4b, including the compound prism P, compensating prism 9, lens 10, and illuminating half-silvered mirrors 18, 18' which characterize the present invention, in the mutual relations as already described in connection with FIG. 3.

The tubular body 11 is formed with a hole concentric with the vertical center axis of the compound prism P, and around the hole is provided a ring-shaped slide 11', on which is slidably placed a holder 12' that carries a transparent glass plate 12 thereon.

Inside the tubular body 11 are also accommodated a lamp 39 which serves as light source, a half-silvered mirror 40, a total reflector 41, and lenses 42, 43. The light from the lamp 39, rendered parallel by the half-silvered mirror 40 and the lens 42, falls as parallel light flux 19' on the illuminating half-silvered mirror 18'. Similarly, the light that has passed through the half-silvered mirror 40 is rendered parallel by the total reflector 41 and the lens 43 and falls as parallel light flux 19 on the illuminating half-silvered mirror 18.

Behind the lens 10 as viewed from the compound prism P there is disposed a surface reflector 22 with an inclination at an angle of 45° to the optical axis of the lens 10, and a real image focusing glass plate 23 having a hairline cross mark is located above the surface reflector 22, both being accommodated in the body tube 11.

Fine-pitch screws 22', 22'' are provided for fine adjustment of the inclination of the surface reflector 22. A positional adjusting collar 23' is provided for turning or up-down movement, as viewed in the figures, of a glass plate 23. A binocular microscope of single objective type for the observation with magnifications of the real image of pads 2 and pedestals 4 as focused on the glass plate 23 is generally indicated at 24. Numeral 25 designates a support member for supporting the tubular body and the microscope together.

An eccentric cam shaft 26 enables the support member 25 to be finely turned about the axis 25' and with respect to a support arm 27 in either of the directions indicated by arrows A. The support arm 27 is turned about an axis 28 in either of the directions marked by arrows B by means of a handle 30, whereby the optical system as a whole, including the compound prism P, is moved out of the position between the chip 1 and the substrate 3. An eccentric stopper 29 is provided for fine adjustment of the position of the support member 25. Below the support arm 27 is secured a roller 31, which rides rotatably on a rail 32.

An ultrasonic horn 14 is adapted to transmit the oscillation from an ultrasonic oscillator (not shown). To this horn 14 is fixed with a screw 16 a suction tip 15, which has a suction hole in the center. This tip is communicated to vacuum suction means (not shown) through a flexible pipe 17.

The horn 14 that carries the tip 15 is vertically movably supported by a post 33' which is formed integrally with the bed plate 33.

The positioning operation of this FD bonder will not be described here because the principle involved is the same as that already described in connection with the arrangement shown in FIG. 3. Explanation will be given, instead, of functions newly added in the embodiment under consideration.

Before proceeding to FD bonding with this bonder, it is important, as the first step, to match the center of the tip 15 exactly with the center of the chip which carries pads 2 (which step is called centering). When out of center, the force with which the tip 15 presses the IC chip 1 downward (i.e., the clamping force of the tip) is not uniformly distributed among the pads 2, some of the pads being pressed excessively against the mating pedestals and the other pads are inadequately pressed, with the result that the ultrasonic energy will not work evenly, or the bond strength will become irregular, or, even if properly positioned, the IC chip may be shifted in position while being subjected to the ultrasonic oscillation. Such trouble can eventually bring a very serious result such as poor a bond or short-circuiting of the pads with neighboring pedestals. In the present apparatus the centering can be accomplished with utmost ease. Before placing an IC chip 1 on the glass plate 12, the operator causes the ultrasonic horn 14 to descend until the lower end of the tip 15 contacts the clear glass 12. While viewing the image of the end of the tip 15 and the hairline cross on the glass 23 through the binocular microscope 24, the observer makes adjustments, turning the eccentric cam shaft 26 and the eccentric stopper 29, so that the center of the tip 15 coincides with the intersection of the hairline cross on the glass 23. As the adjustment with the adjust screws 22', 22'' is done beforehand to ensure that the center or intersection of the hairline cross is brought in complete agreement with the optical axis of the lens 10, the center of the tip 15 is matched exactly with the optical axis of the lens 10.

Next, the tip 15 is raised, an IC chip 1 is placed on the clear glass 12, and the holder 12' carrying the glass 12 is shifted in position until the center of the pads 2 coincides with the intersection of the hairline cross. Accurate center-to-center matching of the tip 15 and the chip carrying the pads 2 is thus accomplished.

As the second step, a substrate 3 is placed on the support 37 and, using the horizontal and vertical fine adjusting mechanisms, the pedestals 4 on the substrate 3 are positioned properly in opposition to the pads 2 of the IC chip 1.

As the third step, the IC chip is picked up. For this purpose the horn 14 is caused to move straight downward till the lower end of the tip 15 lightly touches the rear side of the IC chip 1. Next, a valve (not shown) interposed between the flexible suction pipe 17 and vacuum suction means (not shown) is opened so that the IC chip 1 is attracted by the tip 15 by dint of vacuum. The horn 14 and the tip 15 are then moved straight upward to the original position. The IC chip as positioned properly is sucked up to the lower end of the tip 15, away from the glass plate 12. Picking-up of the IC chip is thus completed.

As the fourth step, FD bonding is carried out. The operator pulls the handle 30 toward him, thereby moving the optical system including the compound prism P out of the position between the IC chip and the substrate properly positioned and centered as described above. The suction tip 15 carrying the IC chip is brought back straight downward so that the pads 2 of the IC chip contact the pedestals on the substrate, with a certain clamping force exerted on the components together. Next, an ultrasonic oscillator (not shown) is switched on to cause oscillation of the horn 14 and tip 15 in order to drive the IC chip 1 and effect relative frictional motions between the contacting surfaces under load of the pads 2 and the pedestals 4. With the progress of the oscillation, the oxide films on the contacting surfaces of the pads 2 and the pedestals 4 are rubbed away and metal-to-metal contact is attained. At the same time, heat of friction is generated to such a degree that the pads 2 and the pedestals 4 begin to be softened and deformed. After the lapse of a certain period preset by a timer, the power supply for the ultrasonic oscillation is automatically cut off. The suction valve then closes and the horn 14 and the tip ascend to the original positions, while the IC chip 1 remains bonded onto the substrate 3, thus completing the bonding. The intensity and duration of the power supply for ultrasonic oscillation vary with the size of the IC chip, numbers of and areas occupied by the pads and pedestals, kinds of metals used, and other factors, but the values as typified in FIG. 1 are about 2 to 10 watts and about 0.2 to 0.5 second, respectively.

The role of the reflector 22 added in accordance with the present invention will be described below. As will be obvious from the explanation of the principle of the invention already made in conjunction with FIG. 3, the real image of the padded plane 2 of FIG. 3 is reflected twice, i.e., by the half-silvered mirror 6 and the total reflector 8 and, accordingly, the real image 20 as viewed from the right in FIG. 3 is equal to the surface image of the chip including the pads 2 as viewed from below the figure. On the other hand, the real image 20' of the pedestaled plane 4 is reflected only once by the half-silvered mirror 6 and, therefore, the real image 20' as viewed from the right in FIG. 3 is inverted sidewise, and the image is inverted in the same way as the pedestaled plane 4 as viewed from below. Actually, however, the IC chip 1 is seen as superposed on the substrate 3, and the real image 20 of the pads 2 and the real image 20' of the pedestals 4 in FIG. 3 are inverted sidewise from the image that is actually observed.

In the apparatus embodying the present invention, therefore, an inverted back image of the pads and an inverted front image of the pedestals are formed on the glass plate 23 through interposition of the total reflector 22 between the lens 10 and the image-forming glass plate 23. The two images superposed on the glass plate 23 are simply inverted and represent the images of the pads 2 and the pedestals 4 as if kept in initimate contact with each other and viewed together from above through the IC chip 1. The real superposed image which is thus obtained is magnified and viewed as an erect image through an ordinary microscope. The direction in which the pads 2 and the pedestals 4 are moved for the purpose of exact positioning agrees with the direction in which the enlarged microscopic image is moved, and the operator can carry out the positioning operation accurately and promptly without psychological confusion. This advantage is derived from the interposition of the total reflector 22. The microscope 24 is an ordinary single-objective binocular microscope, and not a stereoscopic one, because the former is considerably advantageous over the latter; it has greater resolving power, gives freer choice of suitably high magnifications, and is lower priced. This microscope 24 may be replaced by a magnifying projector of know type, without an appreciable influence upon the advantages of the present invention.

The centering of the tip 15 and the padded plane 2 may be accomplished by altering the reflection light path through adjustment of the inclination of the total reflector 22 with the adjust screws 22', 22'', instead of by the adjustment of the eccentric cam shaft 26 and the eccentric stopper 29. It follows that, when the FD bonder is assembled as a whole with a sufficiently high degree of accuracy, the eccentric cam shaft 26 and the eccentric stopper 29 may of course be omitted so as to form the support member 25 and the support arm 27 for the optical system in one piece.

As will be obvious from the foregoing description, the present invention offers many advantages as it permits accurate and prompt positioning of articles or components to be matched and bonded together in such cases where difficulties are involved in viewing the opposing faces of the two workpieces being matched, as for example in the FD bonding of IC chips to packages or LSI circuit substrates, and particularly in that the invention precludes the production of defective IC, LSI and like devices due to inadequate positioning at the time of fabrication, improves the production yield, and remarkably increases the reliability of the products.

Although the present invention has been described in connection with an example in which the pads are formed on the IC chip and the pedestals on the substrate, the invention is equally applicable when the pads and pedestals are provided vice versa. Also, not only IC chips but transistors, diodes and other circuit elements can be as effectively FD bonded in accordance with the present invention. Further, while an arrangement utilizing ultrasonic oscillation as the source of bonding energy has been exemplified, the FD bonding according to the invention is effected as well by heating with pressure.

What we claim is:

1. In a positioning apparatus for matching the relative positions of two components to be bonded or mated face-to-face together in registration including first and second holders which hold said two components in substantially parallel relationship, respectively, position adjusting means for moving at least one of said holders so as to move said components vertically and horizontally towards and away from each other in such a manner as to maintain a mutually parallel relationship therebetween, illumination means for illuminating said two components, respectively, a compound prism inserted between said first and second holders, said compound prism comprising a truncated quadrilateral prism of transparent material having a 45 degree truncation, a rectangular transparent prism having a surface subtending the rectangle thereof and united at the surface with the truncation of the truncated prism into a parallelopiped shape, a half-silvered mirror film serving as a half-silvered mirror and formed at the interface between the truncated prism and the rectangular prism, and a totally reflective mirror film serving as a total reflector and provided on one of the two mutually perpendicular surfaces of the rectangular prism, said one of the two surfaces being opposite to a side of the truncated prism and the other one forming a top of the compound prism which is opposite to the base of the truncated prism, and said total reflector being perpendicularly positioned relative to the two components and facing the half-silvered mirror film with an angle of 45° therebetween, and imaging means provided in substantial alignment with the total reflector on the other side of the half-silvered mirror therefrom for forming images of the two components superposed on each other, the improvement which comprises:

two half-silvered illumination mirrors provided between said compound prism and said first and second holders, respectively, at an angle with respect to the top and the base of the compound prism;

light source means for projecting light onto the respective components through said two half-silvered illumination mirrors, respectively, whereby said half-silvered illumination mirrors and said light source means form said illumination means, so that vertical illumination is provided onto the two components;

pick-up means for picking up one component from its holder positioned above the compound prism, said pick-up means being mounted for movement up and down with respect to the other one of said components fixed in relation thereto;

means for removing said compound prism and the holder for said one component out of the position between the two components and for reinserting said compound prism and the holder in the position;

a compensating prism provided in a position between said compound prism and one of the two components for compensating for residual deviation of the compound prism as well as mechanical error of the apparatus.

2. A positioning apparatus as claimed in claim 1, wherein said compensating prism permits passage therethrough only of a certain wave of a predetermined wave length, so that identification of the images of the respective components can be distinguished.

3. A positioning arrangement according to claim 2, wherein said imaging means includes an additional total reflector positioned on the axis of the total reflector forming part of said compound prism and at an angle thereto and means for adjusting the angle of said additional total reflector.

4. A positioning arrangement according to claim 3, wherein said illumination means, half-silvered mirror, total reflector and said first holder are mounted on a pivotable support member having a hollow tubular portion in alignment with said total reflector and carrying said imaging means.

5. A positioning arrangement according to claim 4, wherein said pick-up means includes a suction tip and holder therefor and means for creating a vacuum suction at said tip.

* * * * *